US010373054B2

(12) United States Patent
Goel et al.

(10) Patent No.: US 10,373,054 B2
(45) Date of Patent: *Aug. 6, 2019

(54) ANNEALED DROPOUT TRAINING OF NEURAL NETWORKS

(71) Applicant: INTERNATIONAL BUSINESS MACHINES CORPORATION, Armonk, NY (US)

(72) Inventors: Vaibhava Goel, Chappaqua, NY (US); Steven John Rennie, Yorktown Heights, NY (US); Samuel Thomas, Elmsford, NY (US); Ewout van den Berg, Bronxville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 688 days.

This patent is subject to a terminal disclaimer.

(21) Appl. No.: 14/842,348

(22) Filed: Sep. 1, 2015

(65) Prior Publication Data

US 2016/0307096 A1    Oct. 20, 2016

Related U.S. Application Data

(60) Provisional application No. 62/149,624, filed on Apr. 19, 2015.

(51) Int. Cl.
*G06N 3/08* (2006.01)
*G06N 20/00* (2019.01)
*G06N 3/04* (2006.01)

(52) U.S. Cl.
CPC .......... *G06N 3/082* (2013.01); *G06N 3/0454* (2013.01); *G06N 3/08* (2013.01); *G06N 20/00* (2019.01)

(58) Field of Classification Search
CPC ........ G06N 3/082; G06N 3/0454; G06N 3/08; G06N 99/005
See application file for complete search history.

(56) References Cited

U.S. PATENT DOCUMENTS 6,269,351 B1 *   7/2001   Black .................. G06F 17/3061
                                                706/12

OTHER PUBLICATIONS

Improving Deep Neural Networks for LVCSR Using Rectified Linear Units and Dropout—2013 George E. Dahl Tara N. Sainathy Geoffrey E. Hinton (Year: 2013).*

(Continued)

*Primary Examiner* — Scott A. Waldron
*Assistant Examiner* — Ababacar Seck
(74) *Attorney, Agent, or Firm* — Tutunjian & Bitetto, P.C.; Grant Johnson

(57) ABSTRACT

Systems and methods for training a neural network to optimize network performance, including sampling an applied dropout rate for one or more nodes of the network to evaluate a current generalization performance of one or more training models. An optimized annealing schedule may be generated based on the sampling, wherein the optimized annealing schedule includes an altered dropout rate configured to improve a generalization performance of the network. A number of nodes of the network may be adjusted in accordance with a dropout rate specified in the optimized annealing schedule. The steps may then be iterated until the generalization performance of the network is maximized.

19 Claims, 5 Drawing Sheets

(56) References Cited

OTHER PUBLICATIONS

Fast dropout training ICML 2013 Sida Wang, Chris Manning (Year: 2013).*
Dropout: A Simple Way to Prevent Neural Networks from Overfitting—2014 Srivastava et al. (Year: 2014).*
Modified Dropout for Training Neural Network Duyck et al. (Year: 2014).*
Global Optimization of Statistical Functions With Simulated Annealing Goffe et al. (Year: 1993).*
Bias-Variance Trade-offs: Novel Applications—2013 Dev Rajnarayan David Wolpert (Year: 2013).*
Ba, et al., Adaptive Dropout for Training Deep Neural Networks, Advances in Neural Information Processing Systems, NIPS, Dec. 2013, pp. 1-9.
Geras, et al., "Scheduled Denoising Autoencoders", International Conference on Learning Representations, May 2015, pp. 1-11.
Hinton, et al., "Improving Neural Networks by Preventing Co-Adaptation of Feature Detectors", arXiv Preprint, Jul. 2012, pp. 1-18.
Kingma, et al., "Variational Dropout and the Local Reparameterization Trick", arXiv, Jun. 2015, pp. 1-13.
Wang, et al., "Fast Dropout Training", Proceedings of the 30 th International Conference on Machine Learning, Jun. 2013, 9 Pages.
Wan, et al., "Regularization of Neural Networks Using DropConnect", Proceedings of the 30 th International Conference on Machine Learning, Jun. 2013, 9 Pages.

* cited by examiner

ANNEALED DROPOUT TRAINING OF
NEURAL NETWORKS

CROSS REFERENCE TO RELATED APPLICATIONS

This application claims priority to Provisional Application No. 62/149,624, filed on Apr. 19, 2015, which is incorporated herein by reference in its entirety.

BACKGROUND

Technical Field

The present invention relates to optimizing network performance using dropout training, and more particularly to optimizing network performance using annealed dropout training for neural networks.

Description of the Related Art

Neural networks are computational systems based on biological neural network architecture. Neural networks may be employed in a variety of applications including, for example, document search, time series analysis, medical image diagnosis, character, speech, and image recognition, and data mining. Neural networks may include a large number of interconnected nodes, and the nodes may be separated into different layers, with the connections between the nodes being characterized by associated vector weights. Each node may include an associated function which causes the node to generate an output dependent on the signals received on each input connection and the weights of those connections.

Recently, it has been shown that neural network performance may be improved by training the neural network by randomly zeroing, or "dropping out" a fixed percentage of the inputs or outputs of a given node or layer in the neural network (e.g., dropout training) for each of one or more training sets (including a set of inputs and corresponding expected outputs) to tune network parameters (number of layers, number of nodes per layer, number of training iterations, learning rate, etc.). A reason for this improvement is that dropout training prevents the detectors in the network from co-adapting, and so encourages the discovery of approximately independent detectors, which in turn limits the capacity of the network and prevents overfitting.

In machine learning/training, overfitting occurs when a statistical model describes random error or noise instead of the underlying relationship. Overfitting generally occurs when a model is excessively complex, such as having too many parameters relative to the number of observations. A model that has been overfit will generally have poor predictive performance, as it can exaggerate minor fluctuations in the data.

The possibility of overfitting may exist because the criterion used for training the model may not be the same as the criterion used to judge the efficacy of a model. In particular, a machine learned/trained model is conventionally trained by maximizing its performance on some set of training data. However, the efficacy of a model is determined by its ability to perform well on unseen data rather than its performance on the training data. Overfitting may occur when a model begins to "memorize" training data rather than "learning" to generalize from trend. As an extreme example, if the number of parameters is the same as or greater than the number of observations, a simple model or learning process may be able to perfectly predict the training data simply by memorizing the training data in its entirety, but such a model will typically fail drastically when making predictions about new or unseen data, since the simple model has not learned to generalize at all.

Conventional dropout training has been shown to improve test-time performance when there is limited data relative to the size of the model being trained. However, in data-plenty situations (which is a more usual scenario in practice), in which the size of the model and training time are the dominant constraints, conventional dropout training does not provide a practical solution to improve network performance. One reason for this is that conventional dropout training can over-constrain a network in data-plenty situations, which may result in overfitting and/or sub-optimal performance.

SUMMARY

A method for training a neural network to optimize network performance, including sampling an applied dropout rate for one or more nodes of the network to evaluate a current generalization performance of one or more training models; generating, using a processor, an optimized annealing schedule based on the sampling, wherein the optimized annealing schedule includes an altered dropout rate configured to improve a generalization performance of the network; adjusting a number of nodes of the network in accordance with a dropout rate specified in the optimized annealing schedule; and iterating until the generalization performance of the network is maximized.

A system for training a neural network to optimize network performance, including a sampler configured to iteratively sample, using a processor, an applied dropout rate for one or more nodes of the network to evaluate a current generalization performance of one or more training models; an annealing schedule generator configured to iteratively generate, using the processor, an optimized annealing schedule based on the sampling, wherein the optimized annealing schedule includes an altered dropout rate configured to improve a generalization performance of the network; and an adjuster configured to iteratively adjust a number of nodes of the network in accordance with a dropout rate specified in the optimized annealing schedule until a generalization performance of the network is maximized.

A computer readable storage medium including a computer readable program for training a neural network to optimize network performance, wherein the computer readable program when executed on a computer causes the computer to perform the steps of sampling an applied dropout rate for one or more nodes of the network to evaluate a current generalization performance of one or more training models; generating, using a processor, an optimized annealing schedule based on the sampling, wherein the optimized annealing schedule includes an altered dropout rate configured to improve a generalization performance of the network; adjusting a number of nodes of the network in accordance with a dropout rate specified in the optimized annealing schedule; and iterating until the generalization performance of the network is maximized.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1B:
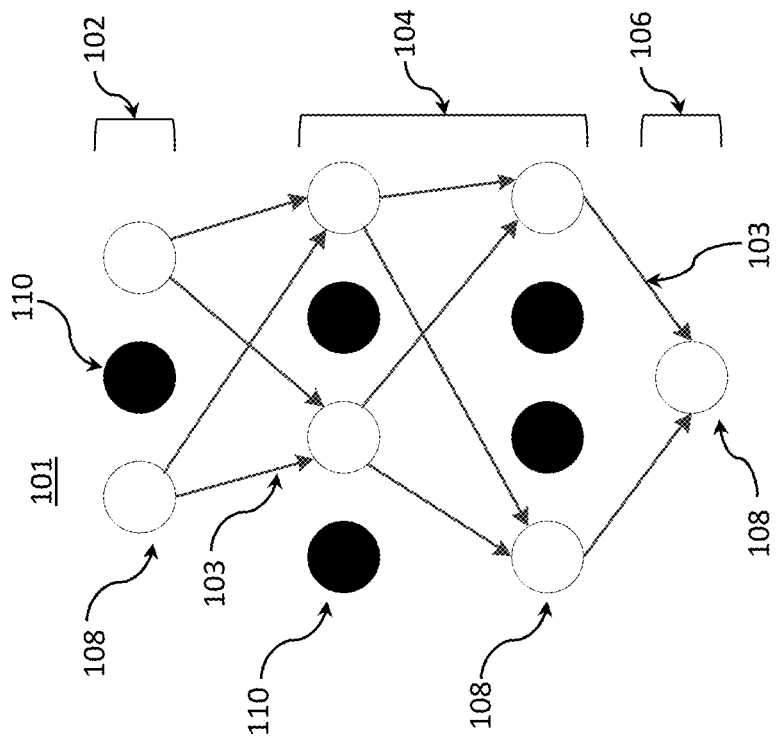
FIG. 1B is a block diagram illustratively depicting an exemplary neural network after applying dropout training to the network in accordance with an embodiment of the present principles.

The present principles optimize network performance by training a neural network. In one illustrative embodiment, training data may be generated by performing annealed dropout training to regularize a deep neural network. The term "dropout" refers herein to dropping out (or adding) nodes/neurons (or other input or output data). In one embodiment, dropout training includes temporarily removing (or adding) one or more nodes/neurons, and temporarily removing (or adding) all incoming and outgoing connections to the removed (or added) nodes/neurons. Annealed dropout training may include selecting an initial annealing schedule (e.g., a schedule specifying a percentage of inputs or outputs of nodes/neurons to add or drop) during training iterations. It is noted that the terms "node" and "neuron" refer to equivalent structures herein.

In accordance with particularly useful embodiments, dropout training (e.g., randomly dropping nodes/neurons (and their connections) from a neural network during training) may be performed for a single iteration, and then a sampling of an applied dropout rate may be taken to evaluate generalization performance (e.g., measurement of how well a learning machine generalizes to unseen (non-training) data).

The present principles provide a new, optimized annealing schedule which may be generated for use in subsequent iterations based on the generalization performance. A percentage of inputs or outputs of nodes/neurons may be annealed (e.g., changed by dropping out or adding inputs or outputs of nodes/neurons during training of a neural network) based on the optimized annealing schedule. An applied dropout rate may again be sampled to evaluate generalization performance of the current training iteration, and if the generalization performance is not maximized, bias correction may be employed according to one embodiment of the present principles.

The steps of optimizing the annealing schedule, which may include adjusting a number (e.g., a percentage) of inputs or output nodes to be dropped, dropping of a percentage of inputs or outputs of nodes, sampling of an applied dropout rate for the current iteration, and performing bias correction, may be iterated until a generalization performance has been maximized (e.g., generalization performance is no longer improving for successive iterations).

In an illustrative embodiment, annealing the dropout rate from a high initial value (e.g., 0.5) to zero over the course of training in, for example, situations where there is plentiful data, can substantially improve the quality of the resulting model over conventional systems and methods, and annealed dropout is also highly effective even in limited data scenarios. In such training scenarios (e.g., plentiful data scenarios), the dropout rate can be annealed to a non-zero value, such that overfitting on "held-out data" in the training procedure is avoided. "Held-out data", as used herein, may include a portion of the total available data not included (e.g., "held-out") during training iterations, and may be used as a test set for learning parameters of, for example, a prediction function.

The model (or ensemble of models) may be subsequently trained for additional iterations with the dropout rate (e.g., inferred dropout rate) held fixed, or the dropout range (inferred dropout range) may be dynamically changed. This procedure alleviates the need to do an exhaustive search for the best dropout rate, which conventionally involves training a model for each dropout rate being considered (e.g., for all parameters). Although held-out data is generally a subset of the training data, the held-out data may be any dataset that is representative of the data that the model will be "testing", or operating on. However, this representative quality is desirable for both the training and testing data, so the held-out data is generally a subset.

For ease of understanding, an example of a common procedure which employs held-out data (cross-validation) will be briefly described. Cross-validation procedures may be employed to assess error rates and evaluate hypotheses for a plurality of mathematical and computer-related procedures. During cross-validation, a portion of data is held out (e.g., the held-out data), an estimation procedure is run on the remainder of the data (e.g., training data), and tests are performed on the held-out data. Thus, a program assertion can be "proven" by showing that the assertion not only functions on the data at hand (e.g., training data), but also to any additional data (e.g., untrained held-out data).

As annealed dropout training may implement model aggregation over an exponential number of networks, the systems and methods according to present embodiments may effectively initialize an ensemble of models that may be learned during a given iteration of training with an ensemble of models that has a lower average number of neurons/nodes per network and higher variance in the number of neurons/nodes per network. This may regularize the structure of the final model (or ensemble of models) to avoid unnecessary co-adaptation between neurons/nodes and to prevent overfitting.

In one embodiment, a regularization procedure (e.g., dropout training) may be stochastic, and may promote the learning of "balanced" networks with neurons/nodes that have high average entropy (and low variance in their entropy), by smoothly transitioning from "exploration" with high learning rates to "fine tuning" with full support for co-adaptation between neurons/nodes where necessary. According to particularly useful embodiments, annealing the dropout rate from a high initial value to a zero or a low non-zero final value over the course of annealed dropout training may substantially improve word error rate (WER) when training neural networks based on acoustic models (e.g., for automatic speech recognition (ASR)), and may significantly reduce WER over-training, which may occur when not employing dropout, and with conventional dropout training systems and methods.

In an embodiment, the system and method for training a neural network to optimize network performance may include maintaining a probability distribution (e.g., parametric, non-parametric) over one or more dropout rates (or other parameters/hyperparameters) during network training according to the present principles. A training iteration may be performed using a processor, and one or more nodes of one or more models may be "dropped out" according to the probability distribution. The current generalization performance of the models resulting from this training iteration may then be determined.

In an embodiment, the dropout rate may be annealed, and the probability distribution over dropout rates (and other parameters/hyperparameters) may be adjusted/evolved. The dropout rate may be employed to train one or more models during a next training iteration (e.g., based on the generalization performance of the models generated by previous iterations. The foregoing may be iterated until a generalization performance of the network is optimized according to various embodiments of the present principles, and will be described in further detail herein below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1A:
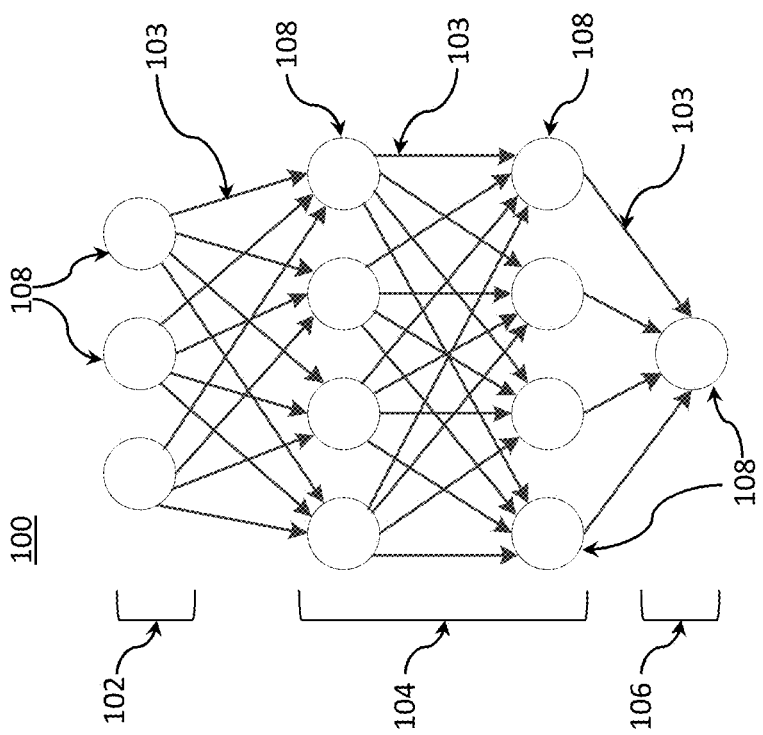
FIG. 1A is a block diagram illustratively depicting an exemplary neural network in accordance with an embodiment of the present principles.

Referring now to the drawings in which like numerals represent the same or similar elements and initially to FIG. 1A, a high-level example of a neural network 100 is illustratively depicted according to one embodiment of the present principles. A neural network 100 may include a plurality of neurons/nodes 108, and the nodes 108 may communicate using one or more of a plurality of connections 103. The neural network 100 may include a plurality of layers, including, for example, one or more input layers 102, one or more hidden layers 104, and one or more output layers 106. In one embodiment, nodes 108 at each layer may be employed to apply any function (e.g., input program, input data, etc.) to any previous layer to produce output, and the hidden layer 104 may be employed to transform inputs from the input layer (or any other layer) into output for nodes 108 at different levels.

Referring now to FIG. 1B, a high-level example of a neural network 101 after applying dropout to the network is illustratively depicted according to one embodiment of the present principles. A neural network 101 may include a plurality of neurons/nodes 108, and the nodes 108 may communicate using one or more of a plurality of connections 103. The neural network 101 may include a plurality of layers, including, for example, one or more input layers 102, one or more hidden layers 104, and one or more output layers 106.

Dropout training may be performed by "dropping out" one or more nodes 110 in the neural network 101. The term "dropout" refers to dropping out nodes (e.g., hidden or visible) in a neural network during training (e.g., temporarily removing the one or more nodes from the network, including all incoming and outgoing connections). The choice of which nodes to drop may be random. Applying dropout to a neural network results in a network model with fewer nodes, and therefore less complexity during training and/or testing. In one embodiment, a plurality of network models (of single or multiple networks) may be generated using dropout training, and this "ensemble" of models may be employed to improve generalization performance.

Figure 2:
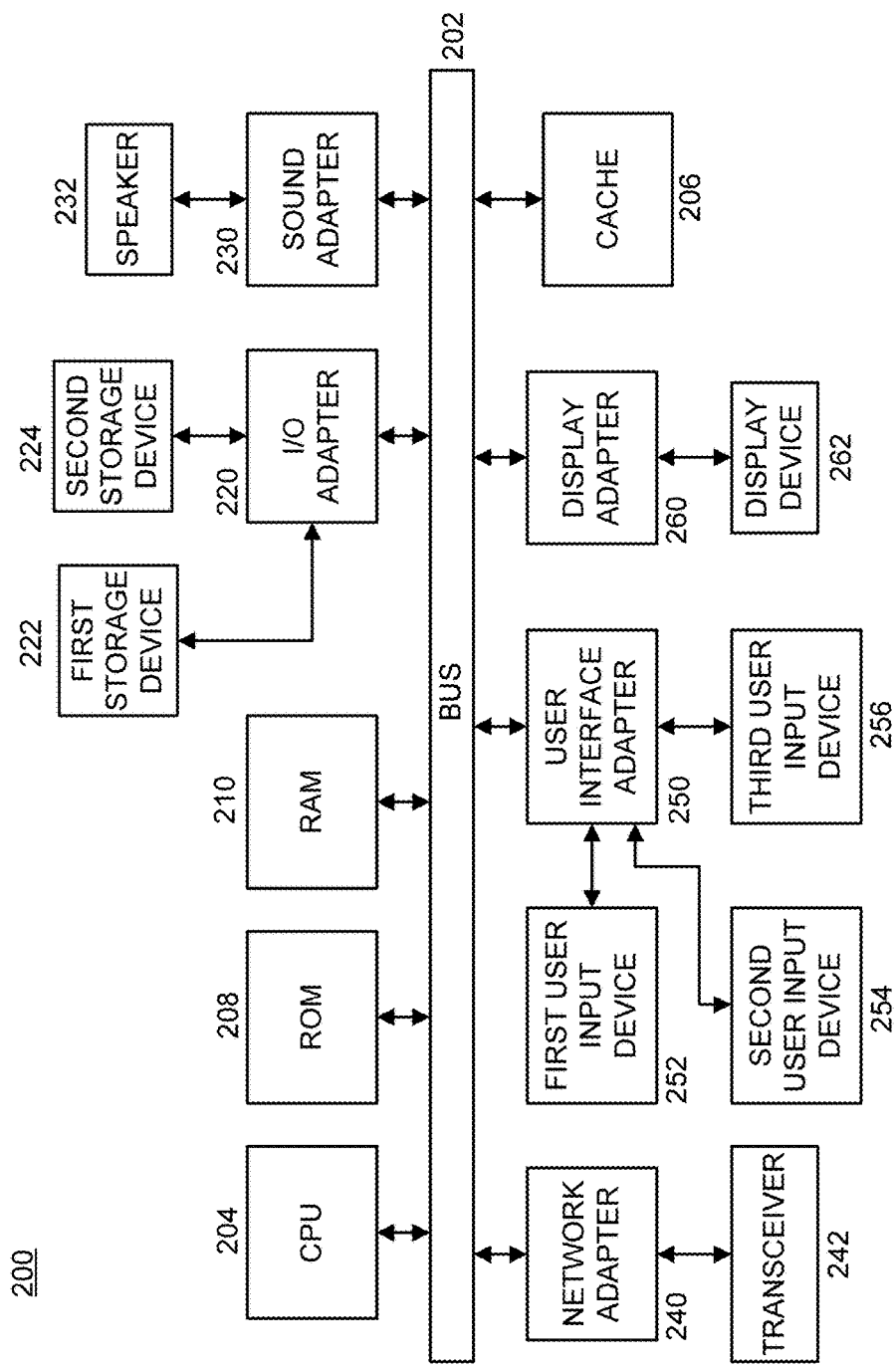
FIG. 2 is a block diagram illustratively depicting an exemplary processing system to which the present principles may be applied, in accordance with an embodiment of the present principles.

Referring now to FIG. 2, an exemplary processing system 200 to which the present principles may be applied is depicted in accordance with an embodiment of the present principles. The processing system 200 includes at least one processor (CPU) 204 operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices.

A speaker 232 is operatively coupled to system bus 202 by the sound adapter 230. A transceiver 242 is operatively coupled to system bus 202 by network adapter 240. A display device 262 is operatively coupled to system bus 202 by display adapter 260.

A first user input device 252, a second user input device 254, and a third user input device 256 are operatively coupled to system bus 202 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 252, 254, and 256 can be the same type of user input device or different types of user input devices. The user input devices 252, 254, and 256 are used to input and output information to and from system 200.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

Figure 3:
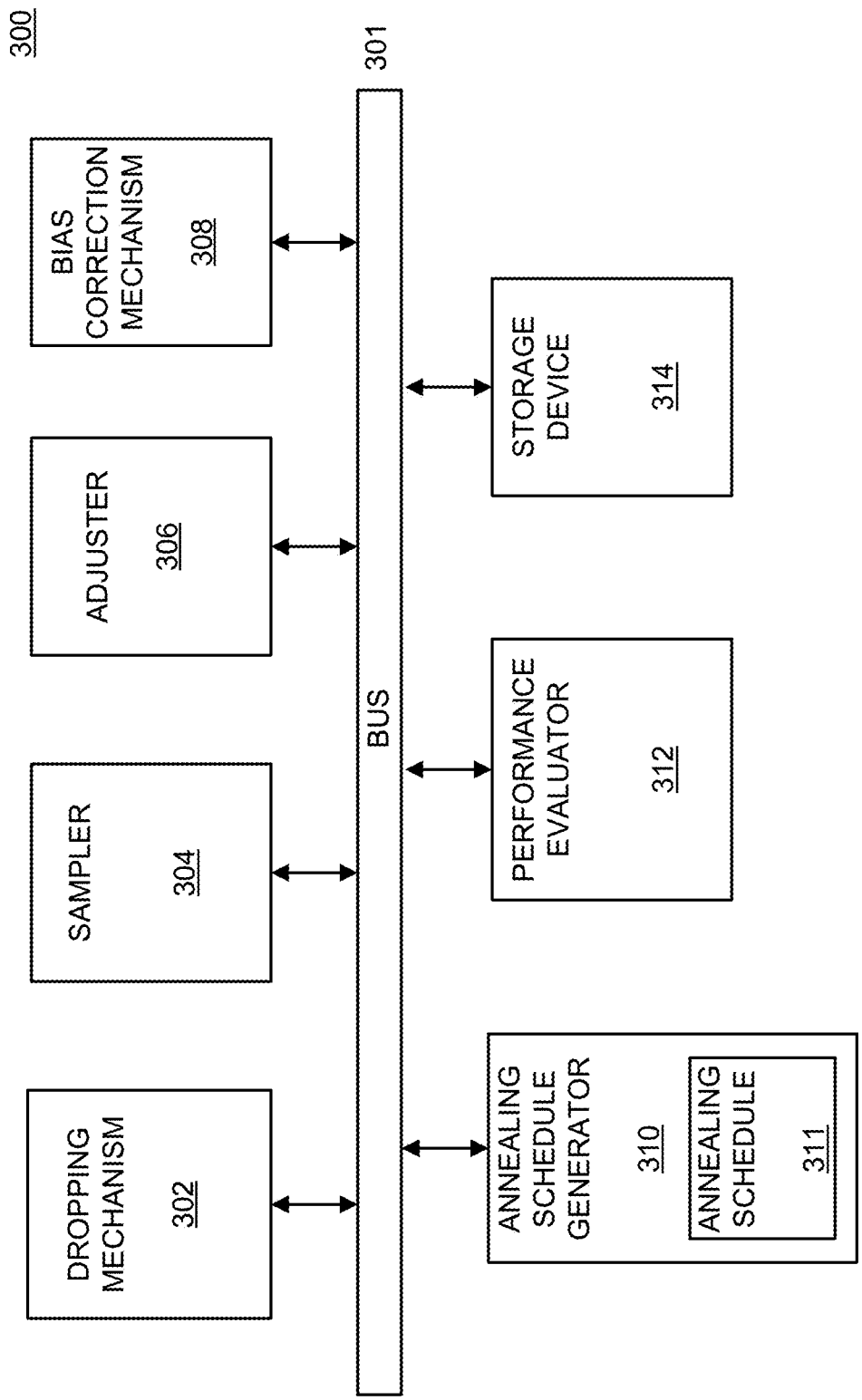
FIG. 3 is a block/flow diagram illustratively depicting an exemplary system for optimizing network performance by employing annealed dropout training according to one embodiment of the present principles.

Moreover, it is to be appreciated that system 300 described below with respect to FIG. 3 is a system for implementing respective embodiments of the present principles. Part or all of processing system 200 may be implemented in one or more of the elements of system 300.

Figure 4:
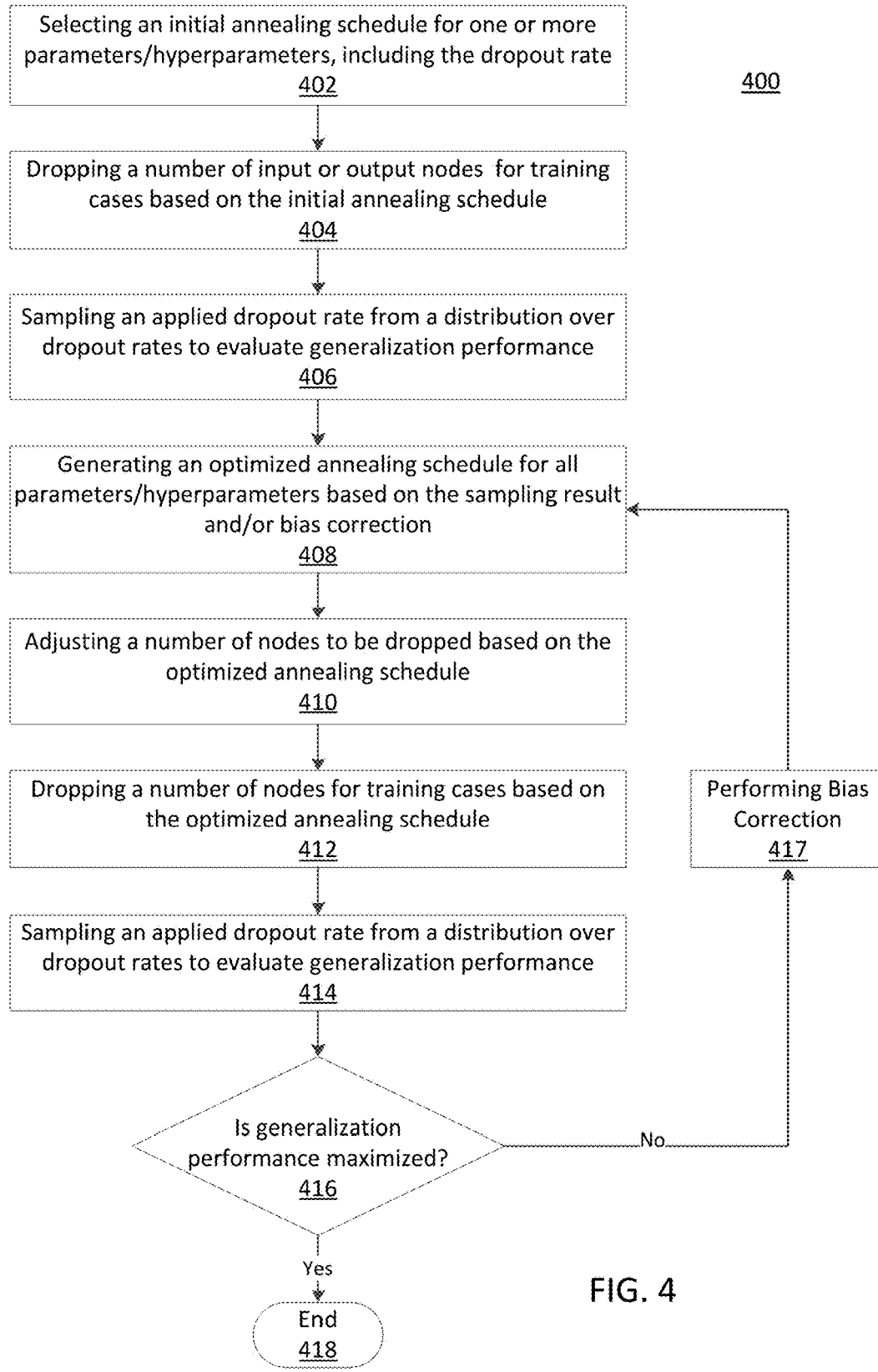
FIG. 4 is a block/flow diagram illustratively depicting an exemplary method for optimizing network performance by employing annealed dropout training according to one embodiment of the present principles.

Further, it is to be appreciated that processing system 200 may perform at least part of the method described herein including, for example, at least part of method 400 of FIG. 4. Similarly, part or all of system 300 may be used to perform at least part of method 400 of FIG. 4.

Referring now to FIG. 3, an exemplary system 300 for optimizing network performance by performing annealed dropout training is illustratively depicted in accordance with an embodiment of the present principles. While many aspects of system 300 are described in singular form for the sakes of illustration and clarity, the same can be applied to multiples ones of the items mentioned with respect to the description of system 300. For example, while a single, optimized annealing schedule 311 may be mentioned with respect to the annealing schedule generator 310, more than one annealing schedule 311 can be generated and used in accordance with the teachings of the present principles, while maintaining the spirit of the present principles. Moreover, it is appreciated that the annealing schedule 311 is but one aspect involved with system 300 than can be extended to plural form while maintaining the spirit of the present principles.

In one embodiment, the system 300 may include a plurality of modules, which may include one or more dropping mechanisms 302, samplers 304, adjusters 306, bias correction mechanisms 308, annealing schedule generators 310, performance evaluators 312 (e.g., to determine, based on held-out data, that a generalization performance of a neural network is maximized), and/or storage devices 314.

Annealed dropout training according to the present principles may include slowly decreasing a dropout probability (e.g., expected dropout probability) of one or more nodes in a network as training progresses. The annealed dropout system 300 according to one embodiment of the present invention may include two main components: 1) an annealing schedule generator 310 that may determine an annealing rate (e.g., a dropout rate for a given epoch, mini-batch, or training iteration), and 2) a dropping mechanism 302 for performing the dropout procedure. These components will be described in further detail hereinbelow.

In one embodiment, an initial annealing schedule (e.g., dropout rate schedule) may be selected and input into the system and stored in a storage device 314. The storage device 314 (e.g., a persistent memory device) may store an initial annealing schedule, an optimized annealing schedule 311, and/or any other data of any data type. Moreover, the storage device 314 stores configurations as well as settings for the configurations. Dropout training may be performed for a single training iteration using the dropping mechanism 302, and then a sampling of an applied dropout rate may be taken using a sampler 304. The data generated from the sampling may be used by the performance evaluator 312 when evaluating generalization performance to determine the efficacy of the present dropout rate.

In one embodiment, the dropout training performed by the dropping mechanism 302 may include, for each new training case for one or more models, randomly zeroing each dimension of the input to the model, node, or input later with probability $p_d$, where $p_d$ is the dropout rate. This is similar to introducing independent, identical, distributed (i.i.d.) Bernoulli multiplicative noise into the model, which masks each input with probability $p_d$. The system/method according to one embodiment of the present invention may be employed to train a single model, or an ensemble of models that share a common set of parameters or hyperparameters. It is noted that each model in the ensemble may have a unique dropout mask associated with it, and as such, may utilize a unique subset of the parameters or hyperparameters (e.g., learning rate, regularization strength, etc.) of the model.

In one embodiment, the system 300 may be employed to jointly train the parameters of an ensemble of models, which may implement a powerful form of regularization in which each weight may be optimized to perform effectively in the context of an exponential set of models that may utilize the training. For example, for a log-linear model with inputs $\chi \in \mathbb{R}$ aggregated over a collection of models sharing connection weights $\{w_{ij}\}$, and each model utilizing a unique dropout mask in the set of all $|\mathcal{M}|=2^n$ possible binary dropout masks over these shared weights, $m_{|\mathcal{M}} \in \mathbb{R}^n : m_{j|}\mathcal{M} \in \{0,1\}$, the geometric average of such a set of exponential models may reduce to:

$$E_\mathcal{M}[\log p(y|x)] \propto \sum_\mathcal{M} p(\mathcal{M}) \log p(y|x, \mathcal{M}) \quad (1)$$

$$\propto \sum_\mathcal{M} p(\mathcal{M}) \sum_j m_{j|\mathcal{M}} w_{ij} x_j$$

$$= \sum_j E_\mathcal{M}[m_j] w_{ij} x_j$$

where $E_\mathcal{M}[m_j]=1-p_d$, and $p_d$ is the dropout rate. This geometric average of the exponential set of models (e.g., ensemble of models) may be employed during testing (e.g., generalization performance testing) using the performance evaluator 312.

Therefore, at testing time, the expected output over the geometric mean of the $2^N$ models (e.g., ensemble of models) being aggregated can be computed by simply turning dropout off using the dropping mechanism 302, and scaling by the dropout rate utilized during training. However, for deep neural networks, results may be different, as non-annealed dropout training (e.g., dropout training without annealing the dropout rate) is effective in practice only in certain situations (e.g., limited data situations), and certain network types (e.g., conditionally linear network models, such as rectified linear (ReLU), Maxout, and Sortout networks). For example, during non-annealed dropout training, Maxout networks may generalize rectified linear (max$\chi$[0,a]) units, utilizing non-linearities of the form:

$$S_j = \max_{i \in C(j)} a_i \quad (2)$$

where the activations $a_i$ may be based on inner products with the outputs of the layer below:

$$a_i = \sum_k w_{ik} x_k + b_i \quad (3)$$

In one embodiment, the dropping of the percentage of outputs using the dropping mechanism 302 may include zeroing a fixed percentage of the outputs, and may include randomly setting the output of a neuron or node to zero. The adjuster 306 may also be employed to increase (e.g., anneal) a dropout rate for successive iterations if the model being learned is overfitting the training data, and may further include iteratively adjusting a dropout rate probability.

In block 306, the adjusting of the dropout rate may include applying a linear, or geometric, fixed decaying schedule to change the probability. This may include inferring (e.g., exactly or approximately), an optimal annealing schedule 311 (or an optimal joint annealing schedule for an ensemble of models) for the learning rate, the dropout probability $p_d$, and any other such so-called hyperparameters of a learning procedure using the annealing schedule generator 310. Determining an annealing schedule 311 (e.g., optimized annealing schedule) according to the present principles may remove the uncertainty of random dropout training, and therefore improve generalization performance during test time.

In one embodiment, a new, optimized annealing schedule 311 may be generated by the annealing schedule generator 310 for use in subsequent training iterations. This optimized annealing schedule 311 may be based, at least in part, on the generalization performance determined by the performance evaluator 312. A percentage of inputs or outputs of nodes may be annealed (e.g., adjusted by dropping out or adding inputs or outputs of nodes during training of a neural network) by the adjuster 306 based on the optimized annealing schedule 311, as determined by the annealing schedule generator 310. An applied dropout rate may again be sampled (e.g., re-sampled) by the sampler 304 to evaluate generalization performance of the current training iteration.

In one embodiment, the generating of the optimal annealing schedule 311 (or optimal joint annealing schedule for an ensemble of models) for all hyperparameters (e.g., dropout rate, learning rate, etc.) by the annealing schedule generator 310 may include considering all or a subset of the set of combinations for an ensemble of models by holding fixed, increasing, or decreasing each hyperparameter by a specified amount, and selecting a subset (e.g., the N best performing models, N>=1) of models that result (e.g., based on one or more iterations of learning), for the application of additional training iterations.

The generating of the optimal annealing schedule 311 in block 310 may further include maintaining a data structure (e.g., a search tree), in which the relationship between models with multiple parameter or hyperparameter changes and their corresponding training models and performance on held out data may be maintained. An optimal or approximately optimal trajectory (e.g., connection path) of parameter or hyperparameter values over the training data may be determined or inferred from this relationship.

In one embodiment, annealed dropout may be performed by the dropping mechanism 302 based on the annealing schedule 311 generated by the annealing schedule generator 310 for training neural networks (e.g., Deep Neural Networks (DNNs)). Annealing is a technique with roots in statistical physics and the maximum entropy principle, and may be applied in machine learning in the context of several non-convex problems (e.g., expectation-maximization (EM) based learning, point matching problems) to mitigate against convergence to poor local minima. Essentially any regularization parameter can be viewed as a "temperature" parameter, and annealing its value over the course of training may gradually allow for more complex explanations/functions of the data to be generated.

In one embodiment, annealed dropout may be employed according to the annealing schedule 311 generated in block 310 to regularize model complexity, and every weight may be constrained to improve the performance of an exponential number of models (e.g., ensemble of models) that may share the same parameter. Annealing the dropout rate (e.g., viewed as a temperature parameter) using the adjuster 306 is an effective way to mitigate against the poor solutions. Dropout training can be viewed as a Monte Carlo approach that optimizes the expected loss over the ensemble of models formed by all possible dropout masks over node outputs (e.g., a Bayesian objective). In one embodiment, a stochastic method for annealed dropout may be employed, and this method may do more than gradually increase the theoretical capacity of the network. It also may mitigate against the convergence to poor local minima by ensuring that gradient information is flowing through all parts of the network during training, which can lead to increases in the realized capacity of the learned network.

In one embodiment, annealed dropout involves slowly increasing or decreasing a dropout probability (e.g., expected dropout probability) of nodes in a network as training progresses according to an optimized annealing schedule 311 generated by the annealing schedule generator 310. When employing the optimized annealing schedule 311 for a given node, the dropout rate may be specified as a function of the data sample(s) being processed (e.g., input or output data for one or more nodes).

For example, if the dropout rate is a function only of the training epoch t, a general formulation according to one embodiment of the present invention may be:

$$p_d[t]=p_d[t-1]+\alpha_t(\theta) \qquad (4)$$

where $0 \leq p_d[t] \leq 1$ is the dropout probability at epoch t, and $\alpha_t(\theta)$ is an annealing rate parameter (e.g., dropout rate parameter) that may optionally depend on the current state (or estimate of the state) of auxiliary inputs/parameters $\theta$ (Including, for example, p_d[t'] for t'<t). It is noted that the term "annealing" implies that $0 \leq \alpha_t \leq 1$, but using variable rate annealing schedules 311 to determine the dropout rate for successive iterations (e.g., instead of a constant or static dropout rate) that increase (or decrease) the dropout rate to be used for the next iteration (e.g. sample the dropout rate from a current distribution estimate) may also be utilized. One straightforward realization of annealed dropout according to one embodiment may be to reduce the dropout rate of all the nodes that have dropout enabled in the network from an initial rate $p_d[0]$ to zero over N steps with constant rate $\alpha_t=-1/N$, giving:

$$p_d[t] = \max\left(0, 1 - \frac{t}{N}\right)p_d[0], \qquad (5)$$

the result giving an amount to anneal (e.g., adjust) the dropout rate for a next iteration.

In one embodiment, the dropping a percentage of inputs or outputs may be performed by the dropping mechanism 302 after the optimized annealing schedule 311 (described above) has been generated by the annealing schedule generator 310. For example, given a dropout probability of $p_d$ for a node, dropout may be applied during the forward pass of training by randomly setting the input or output of the node to zero with probability $p_d$. This may be performed using the sampler 304 to sample from, for example, a uniform distribution $\epsilon(0,1)$, and then setting the output to zero if the sample is less than $p_d$.

The same "mask" of zeros (e.g., dropout mask) that was applied during the forward pass may also be (implicitly or explicitly) applied to any gradients that are received during the backward pass, since the network that is instantiated for that particular training case does not include any neurons/nodes that have been "dropped out". At test time, the dropout probability may be set to zero, and the weights of the network may be re-scaled accordingly, according to one embodiment of the present invention.

In one embodiment, an aggregation may be implemented over an exponential number of models (e.g., ensemble of models), each with a unique dropout mask over the set of weights for a given layer of the network. Annealing the dropout according to one embodiment may include employing a training procedure where an ensemble of models being learned during iteration i may be initialized by an ensemble of models with a lower average number of non-zero weights, and a higher variance in the number of active weights. This is evident given that the probability distribution over n the number of active (e.g., not dropped out) units in a layer of units with the same dropout probability may be binomial-distributed, and therefore:

$$E[n]=N(1-p_d) \qquad (6)$$

$$Var[n]=N(1-p_d)p_d \qquad (7)$$

where N is the number of outputs of the layer, and n is the number of "surviving", non-zero outputs.

Annealing the dropout rate during stochastic training is related to, but is different than performing cross-validation to determine the dropout rate. For example, for a log-linear model, which is convex, training to convergence each time the dropout rate is reduced implements a validation search procedure for the dropout rate as a regularization parameter, on the holdout set. For non-convex optimization problems (e.g., neural network training), annealing the dropout rate according to one embodiment is much more than an approximate validation procedure.

Annealed dropout may be viewed as a 'noisy' training procedure, which can greatly increase the realized capacity of the learned model, (e.g., by mitigating against the convergence to poor local optima). By mitigating against the convergence to poor, locally optimal solutions, the 'noise' in the training procedure may converge to be 'deep' but 'narrow' local minima of a loss function, and may therefore be less likely to be present than in conventional systems and methods, and network performance may be improved. Annealing the dropout rate may result in a very noisy procedure initially, but may result in a less noisy procedure after each iteration of annealed dropout training for fine tuning the network optimization.

In one embodiment, the sampler 304 may perform a search procedure to periodically reduce, or 'prune away', hyperparameter trajectories (e.g., connection paths) which are deemed to be unlikely to result in an optimal trajectory for computational efficiency. The dropout procedure at one or more network layers may include correcting biases associated with each linear projection taken using a bias correction mechanism 308 so that they are consistent with a subspace implied by a dropout mask applied to the input or output of the layer. This may further include inputting dropout mask specific biases for each linear projection taken. The total bias to apply to each linear projection may be determined by, for example, multiplying a dropout mask vector by a matrix of learned biases according to the present principles.

As dropout training according to various embodiments may result in biases in the learned model toward simpler explanations/functions of the data during early training iterations, and may gradually increase the capacity of the model to generate and/or output more complex explanations/functions to evolve for phenomena that cannot 'easily' be explained, bias correction may be performed during training to adjust (e.g., correct) these biases using the bias correction mechanism 308. For example, the present principles may be employed to generate a mapping that goes from input data to output data for nodes, which may be employed during bias correction.

An example of biasing the model toward "simpler explanations/functions of the data" can be illustrated as two points can be joined by a straight line (simpler explanations/functions), or an arbitrarily complex line (complex explanations/functions) to evaluate a data trend. Conventional systems and methods cannot handle these biases (e.g., biases of linear projections) in an effective manner (e.g., they are either left unmodified, or are randomly dropped out). This leads to a suboptimal training/learning procedure for the model (or ensemble of models) because internal decisions (e.g., decisions of network detectors) are not employing the correct bias for the remaining subspace (e.g., after dropout has been applied).

In one embodiment, the biases may be adjusted so that they are correct for the subspace that remains after dropout has been applied to the input or output nodes (e.g., input or output features) of the layer, to ensure that the decisions of, for example, detectors within the network architecture, are being made consistently. For example, adjusting the bias to be correct for the subspace that remains may ensure that internal decisions (e.g., max pooling over models, as in maxout networks and convolutional networks) are correctly computed and propagated through the network during the dropout training procedure.

For simplicity of illustration, this method of handling biases may be referred to as Subout herein. Furthermore, although aspects of the present principles may be applied to a plurality of scenarios and network models, to simplify the notation and exposition for illustrative purposes, an embodiment including correcting the bias associated with a single linear projection $a_j$ after dropout has been applied to the input (or equivalently, the weights of the neuron/node) will be described in further detail herein below. In one embodiment, bias correction using Subout in block 308 may be performed as follows. The linear projection:

$$a_j = w_j^T x + b_j \qquad (8)$$

can alternatively be written:

$$a = w^T(x-x^0) \qquad (9)$$

where $x^0$ is a point on the plane defined by w, and the dependence of w and $x^0$ on the activation index j has been omitted to simplify illustration of the exposition. Taking (without loss of generality) $x_0 = \alpha w$, and solving for alpha to find the point on the plane defined by w that is a multiple of the normal vector w, we have:

$$w^T(\alpha w)+b=0 \qquad (10)$$

which gives $$\alpha = -\frac{b}{|w|^2}.$$

The result is that $$x_0 = -\frac{b}{|w|^2}w.$$

In one embodiment, when no dimensions of the input are dropped out, the usual expression for the activation level may be recovered:

$$a = w^T\left(x + \frac{b}{|w|^2}w\right) \quad (11)$$

$$= w^T x + b \quad (12)$$

However, it is noted that when a subspace of the input $\bar{x}=(x_i:d_i\neq 0)$, where $d=(d_i:i\in\{0,1\})$ is the dropout mask, is input, then the subspace-specific activation may be given by:

$$\bar{a} = \bar{w}^T(\bar{x} - \bar{x}^0) \quad (13)$$

$$= \bar{w}^T\left(\bar{x} + \frac{b}{|w|^2}\bar{w}\right) \quad (14)$$

$$= \bar{w}^T\bar{x} + \frac{|\bar{w}|^2}{|w|^2}b. \quad (15)$$

and the result of the bias determination may be employed to re-weight biases for future iterations.

The above illustrates that when applying dropout according to one embodiment, the biases of each activation may be adjusted using the bias correction mechanism 308 according to the ratio of the squared norm of the weight vector in the remaining subspace, $|\bar{w}|^2$, to the total squared norm, $|w|^2$, of the same weight vector. This may adjust the bias so that it is correct for the subspace implied by the dropout mask. This correction may be subspace specific, and may enable an ensemble of models defined by the dropout procedure (e.g., one model per dropout mask) to properly share their bias parameters, and the overall model to handle any "missing data" scenarios implied by dropout properly.

In one embodiment, Deep Neural Networks (DNNs) may be optimized using stochastic gradient decent (SGD) to correct biases using the bias correction mechanism 308 according to the present principles. This bias correction mechanism 308 may modify the gradient of both the bias and weights of a given model projection by, for example, back propagation, and the gradient of both the bias and the weights may be given by:

$$\frac{\partial a_j}{\partial b_j} = \frac{\|\bar{w}_j\|^2}{\|w_j\|^2}, \quad (16)$$

$$\frac{\partial a_j}{\partial w_{ji}} = d_{ik}x_{ik} + \frac{2b_j}{\|w\|^2}\left(w_{ji}d_{ik} - w_{ji}\frac{\|\bar{w}_j\|^2}{\|w_j\|^2}\right), \quad (17)$$

where k denotes the training case index. If dropout is off $$\left(e.g., \frac{\partial a_j}{\partial b_j} = 1\right),$$

the second term in $$\frac{\partial a_j}{\partial w_{ji}}$$

may no longer be present in some embodiments.

In one embodiment, an effective bias, $$\frac{|\bar{w}|^2}{|w|^2}b,$$

may be computed using the performance evaluator 312, and similar analyses may apply to any back propagation updates (e.g., to determine the corrected bias for one or more dropout masks). If bias has been correctly applied using the bias correction mechanism 308, network performance may improve substantially. For example, in the case of a one model dropout pattern per minibatch (e.g., of the ensemble of models), a rescaled bias vector $\bar{b}=\{\bar{b}_j\forall j\}$ may be constant for the entire minibatch, where $\bar{b}_j$ is the rescaled set of biases.

In one illustrative embodiment, adjusting the biases using the bias correction mechanism 308 may not only affect optimization, but also may affect the biases themselves (e.g., by changing the ratio of norms of weight vectors for connection). For example, let $W=(w_j^T)$, and $\bar{W}=(\bar{w}_j^T)$, then $$\bar{b} = \frac{\bar{W}^{\cdot 2}1}{W^{\cdot 2}1}\cdot b \quad (18)$$

$$= \frac{W^{\cdot 2}d}{W^{\cdot 2}1}\cdot b$$

where "·" is used to denote element wise multiplication, fractions of vectors indicate elementwise division, and $(\,)^{\cdot 102}$ denotes that the elements may be raised to the power of x. Therefore, for $W\in\mathbb{R}^{m\times n}$, the computation may be O(mn) versus the O(mnt) operations employed to compute the activations for a minibatch of t frames (generally t>100). Therefore, in the case of a shared dropout mask over all training cases in each minibatch, dropout training using the corrected biases (hereinafter "Dropsub") may be implemented using the dropping mechanism 302 with minimal overhead according to the present principles.

In one embodiment, one model (dropout pattern) per frame may be employed by the dropping mechanism 302 during dropout training. The result of Dropsub in this example may be O(mn) per training case in the case of assigning a unique, fully random dropout mask to every training case, because $\bar{b}$ may be a function of the dropout mask, and may be O(mn) to compute.

However, if the dropout masks in a given minibatch are restricted to be generated from a small set of 'basis' dropout masks on k disjoint sets of the domain of x, each with l randomly generated dropout masks to choose from (e.g., randomly choose), then the complexity may be reduced from O(mnt) to O(lnm+nt), where l<<t. In practice, there may be high resource costs for breaking up the computation into segments (e.g., k*l 'pieces'), and as Dropsub may handle subspaces consistently, a single random dropout mask per minibatch may suffice.

In one embodiment, model aggregation may occur at test time using the performance evaluator 312 to generate an ensemble of models. At test time, the expected value of the activations over all possible input dropout masks may be computed. For example, the expected value of an activation $a_j$ using the dropout model according to one embodiment of the present invention may be:

$$E[\bar{a}] = E\left[\bar{w}^T \bar{x} + \frac{|\bar{w}|^2}{|w|^2} b\right] \qquad (19)$$

$$= E[\bar{w}^T \bar{x}] + E\left[\frac{|\bar{w}|^2}{|w|^2} b\right] \qquad (20)$$

$$= (1 - p_d)(w^T x + b), \qquad (21)$$

where $p_d$ is the dropout rate (which in this example may be assumed to be the same for all inputs).

In one embodiment, the performance evaluator 312 may determine whether the generalization performance is maximized by evaluating any function of node performance (e.g., learning rate, training performance, network performance, etc.) of the training set on the held-out data for a current iteration. Generally what is measured is the same function that the model is optimizing on the training data, but any function may be employed according to the present principles. As mentioned above, hyperpararmeters (e.g., the dropout rate) can be reduced or increased so that the next iteration fits the training data more appropriately. When it is determined that no performance improvement is being made (e.g., based on heuristics, such as no gain after modifying the hyperparameters for X iterations, where X is a user defined number), for successive iterations, the generalization performance is determined to be maximized, such that the system may stop iterating, and may output results in block 207. This stoppage of iterating may be referred to as "early stopping".

In machine learning, early stopping is a form of regularization used to avoid overfitting when training a learner with an iterative method (e.g., annealed dropout), and may dynamically update the learner and improve the fit to the training data with each iteration. An iterative method may improve the learner's performance on data outside of the training set during iterations until a threshold, but after a threshold has been met (e.g., generalization performance no longer improving), attempts to improve the learner's fit to the training data comes at the expense of increased generalization error. Early stopping provides guidance as to how many iterations can be run before the learner begins to overfit. It is noted that early stopping rules may be employed in many different machine learning methods.

In one embodiment, the sampling of an applied dropout rate for a current iteration using the sampler 304, the generation of an optimized annealing schedule 311 using the annealing schedule generator 310, the adjusting a number (e.g., a percentage) of inputs or outputs to be dropped using the adjuster 306, the dropping of a percentage of inputs or outputs of nodes using the dropping mechanism 302, and the correcting of biases using the bias correction mechanism 308 may be iterated until a generalization performance has been determined to be maximized (e.g., generalization performance is no longer improving for successive iterations) by the performance evaluator 312.

In practice, annealed dropout may be employed to, for example, improve automatic speech recognition (ASR) capability (e.g., Large Vocabulary Conversational Speech Recognition (LVCSR)) according to some embodiments of the present principles. Annealed dropout, which as described above, may be a regularization procedure which gradually reduces the percentage of outputs of nodes that are randomly zeroed out during deep neural network (DNN) training, may lead to substantial word error rate reductions in the case of small to moderate training data amounts and acoustic models trained based on, for example, a cross-entropy (CE) criterion. Annealed dropout training according to the present principles can also substantially improve the quality of ASR systems (e.g., commercial-grade LVCSR systems) even when an acoustic model is trained with sequence-level training criterion, and/or large amounts of data.

Although the above annealing schedules (e.g., fixed, decaying schedule) described for annealing the dropout rate have been illustratively depicted, it is contemplated that other annealing schedules (e.g., more "intelligent" annealing schedules) may also be employed according to some embodiments of the present principles.

For example, a more "intelligent" annealing schedule 311 generated using the annealing schedule generator 310 may employ a tree-search approach that operates as follows. For each of one or more training epochs, four scenarios may be executed to produce four updated models: 1) reduce neither the learning rate nor the dropout rate; 2) reduce the learning rate by a fixed percentage; 3) reduce the dropout rate by a fixed amount; and 4) reduce both the learning rate and the dropout rate by a fixed amount. The model that lowers the error rate (e.g., frame-based phone error rate) may then be selected. However, this approach may be more complex than the other annealing schedules described above.

Referring now to FIG. 4, with continued reference to FIG. 3, a block/flow diagram showing a method 400 for optimizing network performance by employing annealed dropout training is illustratively depicted according to one embodiment of the present principles. In block 402, an initial annealing schedule may be selected and input for one or more parameters or hyperparameters (e.g., dropout rate). In block 404, a number (e.g., a percentage) of input or output nodes for training cases may be dropped based on the initial annealing schedule selected using a dropping mechanism. In block 406, an applied dropout rate may be sampled from a distribution over dropout rates for one or more training models using a sampler. The sampling data may be employed when evaluating generalization performance for a current training iteration. In block 408, an optimized annealing schedule 311 for all parameters and/or hyperparameters may then be generated based on the sampling result and/or bias correction using an annealing schedule generator.

In block 410, a number (e.g., a percentage) of inputs or output nodes to be dropped may be adjusted based on the optimized annealing schedule 311 using an adjuster according to the present principles. In block 412, a number of input or output nodes may be dropped out (or added) based on the optimized annealing schedule 311 using a dropping mechanism. In block 414, an applied dropout rate may be re-sampled from an updated distribution over dropout rates for a current iteration using a sampler. The sampling data may be employed when evaluating generalization performance.

A performance evaluator may be employed to determine whether generalization performance is maximized in block 416, and if the performance is not maximized, bias correction may be performed in block 417 using a bias correction mechanism 308 (as described above with reference to FIG. 3). In one embodiment, the optimizing (408), adjusting (410), dropping (412), sampling (414), and performing of bias correction (417) may be iterated until a generalization performance is maximized. If the generalization performance is determined to be maximized, iterations may be stopped, and the procedure may end in block 418.

Figure 5:
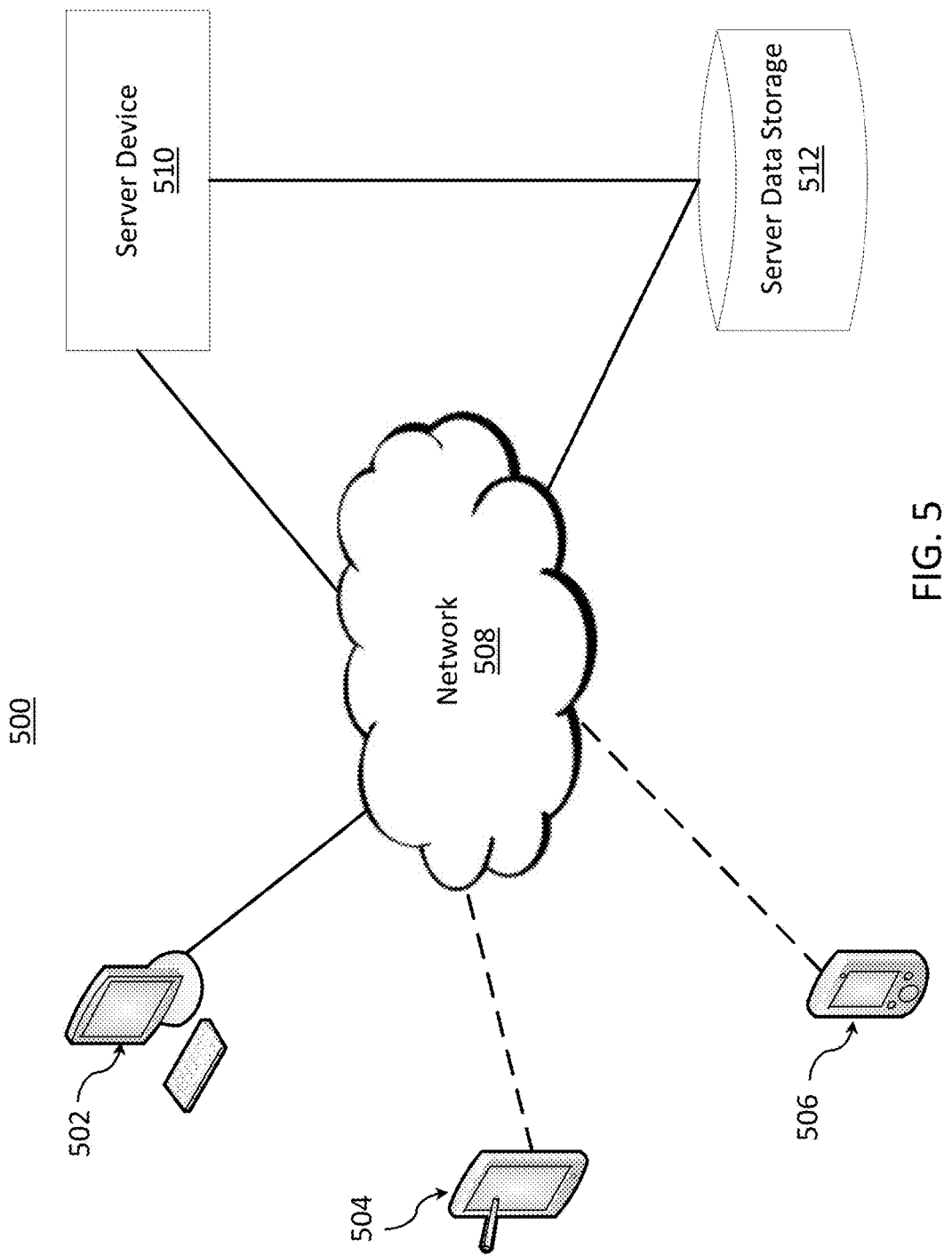
FIG. 5 is a block diagram illustratively depicting an example network and computing architecture in accordance with an embodiment of the present principles.

Referring now to FIG. 5, a block diagram depicting an example network and computing architecture is illustratively depicted in accordance with one embodiment of the present invention. It is noted that FIG. 5 is a simplified block diagram of a communication system 500 in which various embodiments described herein can be employed. Communication system 500 may include client devices such as a desktop personal computer (PC) 502, a tablet computer 504, a mobile phone 506, and/or a plurality of other types of client devices. For example, client devices could also include wearable computing devices, such as head-mounted displays and/or augmented reality displays. Each of these client devices may be able to communicate with other devices (including with each other) via a network 508 through the use of wireline communications (designated by solid lines), wireless connections (designated by dashed lines), and/or any other communication means according to various embodiments.

In one embodiment, the network 408 may be, for example, the Internet, or some other form of public or private Internet Protocol (IP) network (e.g., neural network). Thus, client devices 502, 504, and 506 may communicate using packet switching technologies, but it is noted that the network 508 may also incorporate circuit switching technologies, or other technologies according to various embodiments. A server device 410 may also communicate via the network 508. In particular, the server device 510 may communicate with client devices 501, 504, and 506 according to one or more network protocols and/or application-level protocols to facilitate the use of network-based or cloud-based computing on these client devices. The server device 510 may include integrated data storage (e.g., memory, disk drives, etc.) and may also be able to access a separate server data storage 512. Communication between the server device 510 and the server data storage 512 may be direct, via network 508, or both direct and via network 408. Server data storage may store application data that may be used to facilitate the operations of applications performed by client devices 502, 504, and 506 and server device 410 according to various embodiments.

Although the above configuration of client devices, server device, and server data storage is shown, it is contemplated that the communication system 500 may include any number of each or these components, or other network components according to various embodiments of the present invention. For example, the communication system 500 may include a plurality (e.g., millions (or more)) of client devices, server devices (e.g., thousands (or more)) of server devices, and/or server data storages (e.g., thousands (or more)). Client devices may also include device types other than those depicted in FIG. 4 according to various embodiments. Furthermore, although the present principles have been described in the context of neural networks, the present principles may be employed with any network type (e.g., deep belief networks, deep Boltzmann machines, etc.) according to various embodiments.

Having described preferred embodiments of a system and method for annealed dropout training of neural networks to increase network performance (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A system for training a neural network to optimize performance of a network of interconnected computers, comprising:
   a sampler configured to iteratively sample, using a processor, an applied dropout rate for one or more nodes of the network to evaluate a current generalization performance of one or more training models;
   an annealing schedule generator configured to iteratively generate, using the processor, an optimized annealing schedule based on the sampling, wherein the optimized annealing schedule includes an altered dropout rate configured to improve a generalization performance of the network; and
   an adjuster configured to increase a realized capacity of the neural network by iteratively adjusting a number of nodes of the network based on the altered dropout rate specified in the optimized annealing schedule until a generalization performance of the network is maximized.

2. The system as recited in claim 1, wherein the adjuster is further configured to zero a fixed percentage of the nodes.

3. The system as recited in claim 1, wherein the adjuster is further configured to gradually decrease a dropout probability of the input or output nodes in the network during the training.

4. The system as recited in claim 1, wherein the adjuster is further configured to increase the dropout rate for successive iterations to prevent overfitting of training data.

5. The system as recited in claim 1, wherein the adjuster is further configured to randomly set the output of one or more nodes to zero with dropout probability $p_d$, and wherein the adjusting further comprises iteratively adjusting the dropout probability $p_d$.

6. The system as recited in claim 1, wherein the system further comprises one or more bias correction mechanisms configured to correct biases associated with each of one or more linear projections taken at one or more network layers so that they are consistent with a subspace implied by a dropout mask applied to one or more inputs of the layer.

7. The system as recited in claim 6, wherein the bias correction mechanism is further configured to input dropout mask specific biases for each of the one or more linear projections.

8. A computer readable storage medium comprising a computer readable program for training a neural network to optimize performance of a network of interconnected computers, wherein the computer readable program when executed on a computer causes the computer to perform the steps of:
   sampling an applied dropout rate for one or more nodes of the network to evaluate a current generalization performance of one or more training models;
   generating, using a processor, an optimized annealing schedule based on the sampling, wherein the optimized annealing schedule includes an altered dropout rate configured to improve a generalization performance of the network; and
   increasing a realized capacity of the neural network by iteratively adjusting a number of nodes of the network based on the altered dropout rate specified in the optimized annealing schedule until a generalization performance of the network is maximized.

9. The computer readable storage medium as recited in claim 8, wherein the adjusting a number of nodes further comprises zeroing a fixed percentage of the nodes.

10. The computer readable storage medium as recited in claim 8, wherein the adjusting a number of nodes further comprises gradually decreasing a dropout probability of the nodes in the network during the training.

11. The computer readable storage medium as recited in claim 8, wherein the adjusting a number of nodes further comprises increasing the dropout rate for successive iterations to prevent overfitting of training data.

12. The computer readable storage medium as recited in claim 8, wherein the applied dropout rate is sampled from a distribution over dropout rates, which are estimated or evolved as network training proceeds.

13. The computer readable storage medium as recited in claim 8, wherein the adjusting a number of nodes further comprises randomly setting the output of one or more of the nodes to zero with dropout probability $p_d$, and wherein the adjusting a number of nodes further comprises iteratively adjusting the dropout probability $p_d$.

14. The computer readable storage medium as recited in claim 13, wherein the adjusting a number of nodes further comprises applying one of a linear or geometric fixed decaying schedule to adjust the dropout probability $p_d$.

15. The computer readable storage medium as recited in claim 8, wherein the generating the optimized annealing schedule further comprises generating an optimized joint annealing schedule, as indicated by a loss function on the held-out data, for at least one of a learning rate, the dropout probability $p_d$, and any other hyperparameters of the learning procedure for two or more training models.

16. The computer readable storage medium as recited in claim 15, wherein generating the optimized joint annealing schedule further comprises:
considering all or a subset of the set of combinations implied by one of holding fixed, increasing, or decreasing each hyperparameter by a specified amount; and
selecting a subset, including the N best performing models, N>=1, of models that result, based on one or more iterations of learning, for application in additional training iterations.

17. The computer readable storage medium as recited in claim 8, wherein the training further comprises correcting biases associated with each of one or more linear projections taken at one or more network layers so that they are consistent with a subspace implied by a dropout mask applied to one or more inputs of the layer.

18. The computer readable storage medium as recited in claim 17, wherein the training further comprises inputting dropout mask specific biases for each of the one or more linear projections.

19. The computer readable storage medium as recited in claim 18, wherein the dropout mask specific biases are realized with a matrix of learned biases, and a total bias to apply to each linear projection is determined by multiplying a dropout mask vector by a matrix.

* * * * *